US012768411B2

(12) United States Patent
Jedele et al.

(10) Patent No.: US 12,768,411 B2
(45) Date of Patent: Oct. 20, 2026

(54) BALL AND NUT ASSEMBLY

(71) Applicant: Akebono Brake Industry Co., Ltd., Tokyo (JP)

(72) Inventors: Philip Nathanael Jedele, Ypsilanti, MI (US); Lakshminarayanan Vaidyanathan, Farmington Hills, MI (US)

(73) Assignee: Akebono Brake Industry Co., Ltd., Tokyo (JP)

( * ) Notice: Subject to any disclaimer, the term of this patent is extended or adjusted under 35 U.S.C. 154(b) by 632 days.

(21) Appl. No.: 18/157,139

(22) Filed: Jan. 20, 2023

(65) Prior Publication Data

US 2024/0247697 A1 Jul. 25, 2024

(51) Int. Cl.

| | |
|---|---|
| ***F16D 55/08*** | (2006.01) |
| ***F16D 65/18*** | (2006.01) |
| ***F16H 25/20*** | (2006.01) |
| *F16D 125/40* | (2012.01) |

(52) U.S. Cl.
CPC ......... *F16D 65/18* (2013.01); *F16H 25/2015* (2013.01); *F16D 2125/40* (2013.01)

(58) Field of Classification Search
CPC ..... F16D 65/18; F16D 2125/40; B60T 13/741
See application file for complete search history.

(56) References Cited

U.S. PATENT DOCUMENTS

| | | | |
|---|---|---|---|
| 4,375,250 A | 3/1983 | Burgdorf | |
| 6,767,305 B2 | 7/2004 | Backes et al. | |
| 7,007,775 B2 | 3/2006 | Kapaan et al. | |
| 8,327,981 B2 | 12/2012 | Giering et al. | |
| 8,561,762 B2 | 10/2013 | Schupska | |
| 8,707,812 B2 | 4/2014 | Osterlanger et al. | |
| 10,267,369 B2 | 4/2019 | Lethorn | |
| 11,460,082 B2 | 10/2022 | Al-mahshi | |
| 2003/0050147 A1 | 3/2003 | Backes et al. | |
| 2004/0093973 A1 | 5/2004 | Halasy-Wimmer et al. | |
| 2018/0058553 A1* | 3/2018 | Kick-Rodenbuecher | F16H 25/2015 |
| 2022/0163076 A1 | 5/2022 | Fawcett | |
| 2023/0383826 A1* | 11/2023 | Segawa | F16H 25/2204 |
| 2024/0060551 A1* | 2/2024 | Brubaker | F16D 65/18 |

FOREIGN PATENT DOCUMENTS

| | | |
|---|---|---|
| EP | 1920993 A1 | 11/2007 |
| EP | 2464897 B1 | 7/2010 |
| WO | 01/21975 A1 | 3/2001 |
| WO | 2007/095901 A1 | 8/2007 |

* cited by examiner

*Primary Examiner* — Nicholas J Lane
(74) *Attorney, Agent, or Firm* — The Dobrusin Law Firm, P.C.

(57) ABSTRACT

A ball and nut assembly adapted for a brake system of a vehicle, comprising: (a) a nut having a threaded portion; (b) a spindle having a threaded portion positioned at least partially within the nut so that the threaded portion of the spindle engages the threaded portion of the nut; and (c) an end stop positioned adjacent to the spindle, wherein a mating area is located between the end stop and the spindle, the mating area includes a contact region in which the end stop contacts the spindle directly or indirectly, and the contact region includes a circumferential area greater than a circumferential area of a single line contact between the end stop and the spindle.

13 Claims, 9 Drawing Sheets

BALL AND NUT ASSEMBLY

FIELD

The present teachings generally relate to a brake system, and more particularly, to a ball and nut assembly adapted to drive a piston.

BACKGROUND

Various brake systems are used in a wide array of vehicle and/or transportation applications. These brake systems may include one or more pistons, a floating caliper housing or an opposed piston (or fixed) caliper housing, or a combination thereof. Often these brake systems will also include a rotary to linear actuator, such as a ball and nut assembly (BNA).

The BNA may be powered by a motor directly or indirectly connected to the BNA. During a brake apply, the BNA may receive the power and at least a portion of the BNA (e.g., a spindle) may be rotated. This rotation may then be converted through one or more stages in the BNA into a linear movement to drive a piston towards one or more brake pads or shoes, thereby creating a clamping force between the one or more brake pads and a rotor or drum. Over time, such brake apply operations may cause wear on the BNA between one or more movable components. Similarly, the forces applied during operation of the BNA may frequently degrade the BNA, distort the BNA, or both. As a result, the BNA may not operate as intended throughout the life of the BNA.

Examples of brake systems and ball and nut assemblies can be found in U.S. Pat. Nos. 4,375,250; 8,561,762; 8,707,812; 10,267,369; and 11,460,082; and U.S. patent Publication No. 2022/0163076, all of which are incorporated herein in their entirety for all purposes. Based on the above, it would be attractive to have a brake system with one or more ball and nut assemblies (BNA) that operate in a highly efficient manner. What is needed is a BNA having a nut and spindle that operate in a consistent manner through the life of the BNA. Additionally, it would be attractive to have a BNA that minimizes distortion during operation of the BNA. Thus, what is needed is a BNA that maintains continuous contact between a screw of the BNA and a flange of the BNA to prevent unwanted deflection and/or degradation of the components therein. Moreover, it would be attractive to have a BNA that decreases friction between a screw therein and one or more additional components of the BNA. Therefore, what is needed is a BNA having engagement surfaces between a screw and additional components therein that aids rotation and efficiently transfers load of the screw during operation.

SUMMARY

The present teachings meet one or more of the present needs by providing: a ball and nut assembly adapted for a brake system of a vehicle, comprising: (a) a nut having a threaded portion; (b) a spindle having a threaded portion positioned at least partially within the nut so that the threaded portion of the spindle engages the threaded portion of the nut; and (c) an end stop positioned adjacent to the spindle, wherein a mating area is located between the end stop and the spindle, the mating area includes a contact region in which the end stop contacts the spindle directly or indirectly, and the contact region includes a circumferential area greater than a circumferential area of a single line contact between the end stop and the spindle.

The contact region may include a plurality of direct or indirect line contacts between the end stop and the spindle. The contact region may include one or more planar contacts between the end stop and the spindle, whereby each planar contact has a circumferential area greater than a single line contact. The contact region may include direct contact between the end stop and the spindle. The contact region may include one or more bearings located between the end stop and the spindle so that the end stop and the spindle are free of direct contact.

A line contact between the end stop and the spindle may have a width of about 10 microns or less and the contact region may have a width of about 50 microns or more. The spindle may include a single arcuate surface within the mating area that may contact the end stop in a first contact region and a second contact region, and the single arcuate surface of the spindle may be free of contact with the end stop between the first contact region and the second contact region to form a gap therebetween, the gap having a width, as measured between the arcuate surface and the end stop, of about 0.1 mm to about 2 mm. The spindle may contact the end stop in the first contact region as a first line contact along a surface of the end stop that is parallel to a longitudinal axis of the spindle. The spindle may contact the end stop in the second contact region as a second line contact along a surface of the end stop that is perpendicular to the longitudinal axis of the spindle.

A surface of the end stop within the mating area may include one or more arcuate portions. A surface of the end stop within the mating area may be a convex surface. A surface of the spindle within the mating area may be a concave surface. A surface of the spindle within the mating area may be arcuate. The surface of the spindle within the mating area may include a plurality of radii of curvature.

A surface of the spindle within the mating area may include a plurality of interconnected chamfered or linear segments, whereby each of the interconnected chamfered or linear segments may create a contact region where the spindle contacts the end stop. The spindle may be free of contact with the end stop between the contact regions created by the chamfered or linear segments to form a plurality of gaps therein.

The end stop may include a bearing. Rollers of the bearing may be located between the spindle and the end stop to form the one or more contact regions between the spindle and the end stop. The bearing may be a ball bearing positioned in a channel located within the mating area, the channel being formed by a groove of the spindle and a groove of the end stop.

A surface of the spindle, a surface of the end stop, or both may include a surface deformation formed from machining and/or mechanical surface treatment that may decrease friction between the spindle and the end stop. The surface of the spindle, the surface of the end stop, or both may be hardened and/or coated.

The present teachings meet one or more of the present needs by providing a ball and nut assembly for a brake system of a vehicle, comprising: (a) a nut having a threaded portion; (b) a screw located at least partially within the nut, wherein a threaded portion of the screw engages a threaded portion of the nut; (c) a spindle extending through the screw so that rotation of the spindle causes rotation of the screw; and (d) an end stop in communication with the spindle, the screw, or both, wherein a mating area is located between the end stop and the screw, the mating area includes a contact region in which the end stop contacts the screw directly or indirectly, and the contact region includes a circumferential area greater than a circumferential area of a single line contact between the end stop and the screw.

The screw may contact the end stop along a plurality of contact regions within the mating area. A surface of the end stop within the mating area may be substantially planar. The surface of the end stop within the mating area may taper away from the screw or towards the screw. The surface of the screw within the mating area may be substantially planar or may include one or more arcuate segments.

An engaging portion of the screw may extend into a receiving portion of the end stop. The spindle may extend through the receiving portion and may be free of contact with the end stop. The spindle, the screw, or both may include an anti-rotation feature that prevents rotation of the spindle relative to the screw, or vice versa.

The present teachings meet one or more of the present needs by providing: a brake system with one or more ball and nut assemblies (BNA) that operate in a highly efficient manner; a BNA having a nut and spindle that operate in a consistent manner through the life of the BNA; a BNA that minimizes distortion during operation of the BNA; a BNA that maintains continuous contact between a screw of the BNA and a flange of the BNA to prevent unwanted deflection and/or degradation of the components therein; a BNA that decrease friction between a screw therein and one or more additional components of the BNA; a BNA having engagement surfaces between a screw and additional components therein that aids rotation and efficiently transfers load of the screw during operation; or a combination thereof.

DETAILED DESCRIPTION

Figure 1:
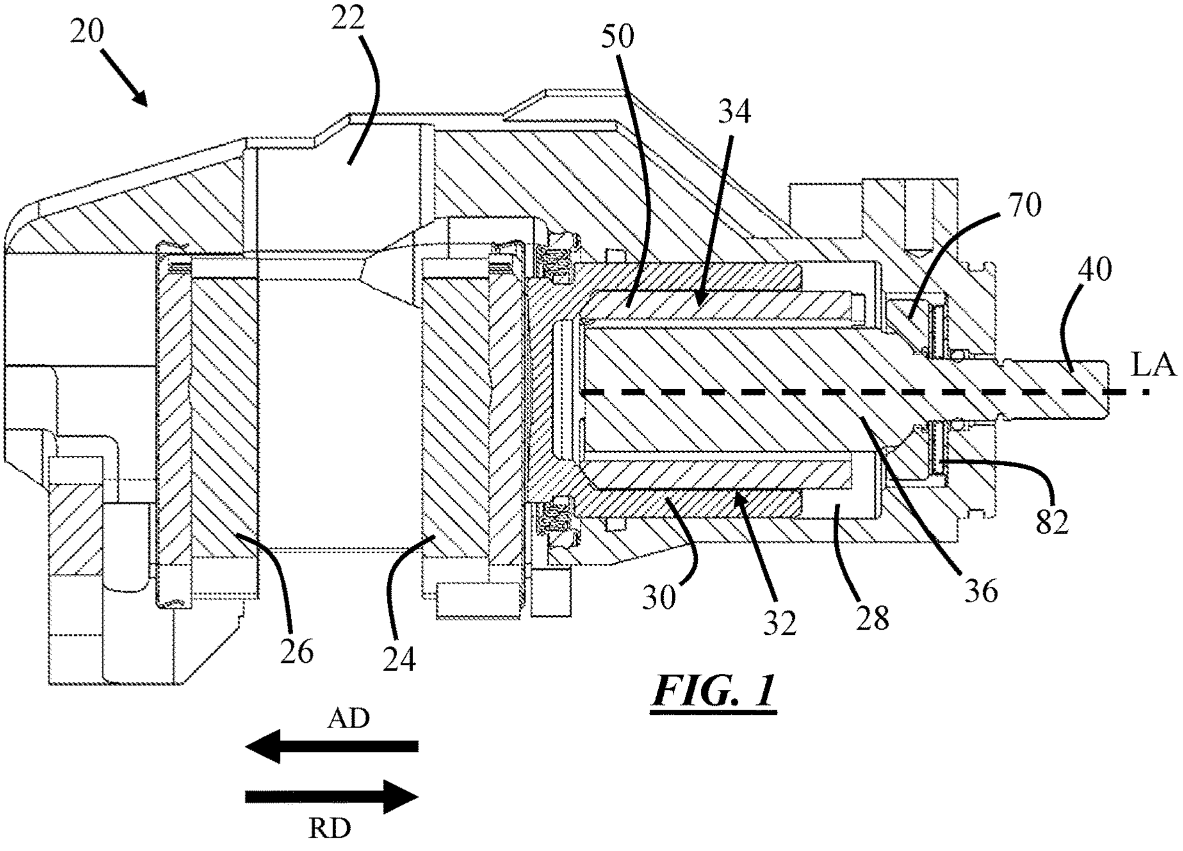
FIG. 1 is a cross-sectional view of a brake system illustrating a ball and nut assembly located therein.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to brake systems. The brake system may be adapted for use in a vehicle, such as a passenger vehicle, commercial vehicle, or both. However, it is envisioned that the brake system as described herein may not be limited to passenger and/or commercial vehicles, but rather may also be incorporated into other vehicles, such a train, airplane, bus, or a combination thereof.

The brake system may function to decelerate a vehicle. The brake system may also be configured to maintain a vehicle position when stationary (i.e., parked). The brake system may include one or more stationary components, one or more dynamic components, or both. The brake system may utilize one or more brake pads or brake shoes to engage a rotor or disc of a vehicle wheel. The brake pads or brake shoes may apply a clamping load to the moving rotor or disc to decelerate and eventually stop the vehicle (i.e., a brake apply operation). Similarly, the brake pads or brake shoes may apply a continuous load to the rotor or disc when the vehicle is stationary to maintain a position of the vehicle (i.e., a parking brake apply operation).

The brake system may have any desired configuration. It is envisioned that the teachings here may be related to any number of brake systems. The brake system may include one or more brake calipers, one or more pistons, or both. The brake system may include a fixed opposed brake caliper, a floating caliper, or both. The brake system may include a single piston, twin pistons, more than two pistons, or a combination thereof. The brake system may be an electrical brake system with a hydraulic load application or a fully electromechanical brake system free of a hydraulic load application. The brake system may include both a hydraulic load application and a fully electromechanical braking load application based on certain circumstances. For example, the brake system may apply a hydraulic load during a brake apply operation when the vehicle is moving yet apply a fully electromechanical braking load free of a hydraulic load during a parking brake apply operation. However, in certain situations, a hydraulic load may be used in conjunction with a fully electromechanical brake load.

As stated above, the brake system may include one or more brake pads or brake shoes. The brake pads or brake shoes may function to contact a rotor of a vehicle to stop movement of the rotor. The brake pads or brake shoes may be moved directly by the brake system. That is, a dynamic component of the brake system, such as a piston, may contact the brake pad or brake shoe directly to move the brake pad into contact with the rotor. Similarly, the brake system may also indirectly move the brake pad or brake shoe by contacting an intermediate component, such as a pressure plate secured or otherwise connected to the brake pad. In either case, the brake system may create a clamping or frictional force on the rotor using the brake pads or brake shoes.

The brake system may include a piston. The piston may function to drive the brake pads or brake shoes of the brake system towards the rotor or disc of a vehicle wheel. The piston may apply a load on the brake pads or brake shoes to decelerate the rotor or disc of the vehicle wheel. Similarly, the piston may maintain an applied load on the brake pads or brake shoes to maintain a position of the rotor or disc of the vehicle wheel, thereby maintaining a position of the vehicle itself (i.e., the vehicle when parked). Moreover, as stated above, the piston may be electromechanically driven with or without a hydraulic load application. That is, the piston may be driven fully or partially by a hydraulic load, fully or partially by an electromechanical load, or a combination thereof. Such application of load may drive the piston in a direction substantially parallel to an axis of rotation of the rotor or the disc, axially along the axis of rotation of the rotor, or both.

The piston may be at least partially positioned within a piston housing. The piston housing may function to at least partially contain and/or protect the piston. The piston housing may be formed with the caliper bore of the brake system, such as a caliper bore, caliper cavity, caliper channel, etc. However, the piston housing may also be a secondary housing that is attached or otherwise secure to or within the caliper bore. While any size or geometry may be used for the piston housing, it is envisioned that the piston housing may be shaped similar to at least a portion of the piston to allow for proper sealing of the piston within the piston housing. For example, the piston may be seated within the piston housing so that a gap between the piston and the piston housing may be sealed to prevent leakage of the hydraulic fluid located within the piston housing.

The piston housing may be located anywhere along the caliper bore. The piston housing may be located adjacent to a position of the brake pad so that movement of the piston contacts the brake pad. Similarly, the piston housing may be positioned within the caliper bore so that movement of the piston is parallel to, or coaxial with, the axis of rotation of the vehicle rotor or disc. However, such mounting of the piston housing in the desired location is not limited to any specific mounting features. But rather, mounting or incorporation of the piston housing within the caliper bore may be completed using one or more fasteners, one or more adhesives, integral forming of the piston housing with the caliper bore, or a combination thereof.

The piston may be in communication with a ball and nut assembly (BNA). The BNA may function to translate a rotational movement into a linear movement to axially drive the piston towards and/or away from the brake pads or brake shoes. The BNA may include one or more components that move axially, one or more components that rotate about an axis yet remain axially stationary, one or more components that remain stationary, or a combination thereof. The BNA may include one or more stages to convert the rotational movement into a linear movement. The BNA may include one or more mechanical components, one or more electrical components, or both.

The BNA may be positioned anywhere near the piston to drive the piston. The BNA may contact one or more pieces of the piston. For example, the BNA may contact a piston face, a body of the piston (e.g., piston main), or both. However, the BNA may also be free of contact with one or more pieces of the piston, such as the piston main. The BNA may be positioned adjacent to the piston or piston face such that a dynamic component of the BNA may contact and drive the piston. It is envisioned that at least a portion of the BNA may be positioned within the piston housing (e.g., within a piston pocket located within the piston housing). Thus, the BNA may be at least partially protected by the piston and may drive the piston by contacting an inner wall of the piston located within the housing of the piston. The BNA may also retract the piston during a release operation in certain circumstances so that the piston disengages the brake pads or brake shoes, thereby allowing for the brake pads or brake shoes to disengage the rotor or disc of the vehicle.

Additionally, it is envisioned that the BNA may provide a back drive force such that, during a brake release operation, the back drive force may at least partially move the BNA in a release direction, thereby at least partially releasing a clamping force between the brake pad assemblies and the brake rotor. Such back drive may be made possible or facilitated by one or more balls, one or more ball springs, one or more bushings, or a combination thereof located within the BNA. Such back drive may also generally be made possible by a spindle and a nut of the BNA.

The spindle may be rotated by the motor or a corresponding driving gear of the brake system. The spindle may be rotated in an apply direction and a release direction to apply and release the brake system, respectively. Rotation of the spindle may cause a nut threadably engaged with the spindle to move axially along an axis of apply or release direction to move the brake pads towards or away from the brake rotor. The spindle may be driven directly by a driving gear (e.g., direct connection or attachment between the two elements). The spindle may be driven indirectly by a driving gear (e.g., indirect connection or attachment between the two elements, meaning one or more gears, shafts, belts, chains, or other intermediate connection members are provided between the spindle and the driving gear).

The spindle may include an input portion that receives input from the motor (e.g., the driving gear) directly or indirectly to rotate the spindle about an axis of rotation. The input portion of the spindle may be an end portion of the spindle adjacent to the driving gear or corresponding driving mechanism of the motor.

The nut may be moved axially along an axis that the spindle is configured to rotate about. For example, the nut and the spindle may be threadably engaged such that when the spindle is rotated by the motor or driving gear, the nut moves axially toward or away from a wall of the piston pocket. After contact between the nut and the piston pocket wall is made, further movement of the nut may result in movement of a piston and thus a brake pad assembly, or a corresponding end of a brake pad towards a brake rotor. The nut may also be restricted or prevented from rotating about the axis along which it is configured to axially move.

The spindle may directly drive the nut during a brake apply and/or brake release operation. The spindle may indirectly drive the nut during a brake apply and/or brake release operation. Indirect driving of the nut by the spindle may be facilitated one or more balls located between the spindle and the nut. The one or more balls may form a bearing that promotes movement of the spindle relative to the nut, or vice versa, that drives the nut via the spindle. The balls may be located between the threaded portion of the spindle and the threaded portion of the nut. For example, the balls may move along the threaded portions of the spindle and/or the nut between one or more return caps positioned within the nut (e.g., within a cutout or hole of the nut). As a result, the threaded portion of the spindle may be free of contact with the threaded portion of the nut based upon engagement of the balls located therein.

The spindle may also be in communication with the nut by a screw located therein. The screw may function to translate rotation of the spindle into movement and/or rotation of the nut. The screw may function to directly engage both the spindle and the nut. The screw may be at least partially positioned between the spindle and the nut. That is, the screw may function as an intermediate between the spindle and the nut.

The screw may rotate based upon rotation of the spindle. The screw may remain stationary or rotate based upon rotation of the nut. The screw may be threadably engaged to the nut and/or the spindle. The screw may be engaged to the nut and/or the spindle in a manner free of threading. That is, the screw may still rotate based upon input received from the spindle and/or the nut without utilizing threading.

To accommodate such communication, the screw may include an anti-rotation feature that engages the spindle. The anti-rotation feature may function to prevent rotation of the screw independently of the spindle, or vice versa. The anti-rotation feature may engage the spindle such that rotation of the spindle results in rotation of the screw. The anti-rotation feature may be a notch, groove, projection, or a combination thereof located along an interior surface that engages an exterior surface of the spindle. The anti-rotation feature may be one or more contoured surfaces, one or more planar surfaces, or both located along an interior surface of the screw. The anti-rotation feature may be linear segments along a surface of the screw that is otherwise circular shaped. The anti-rotation features may be a friction surface to decrease slippage between the screw and the spindle. Such a surface may also form a press-fit condition between the spindle and the screw.

The anti-rotation feature of the screw may extend along a portion of an interior surface of the screw as measured along a length of the screw (i.e., measured along or parallel to a longitudinal axis of the screw (e.g., an axis of rotation of the screw)). The anti-rotation feature of the screw may extend along an entire length of an interior surface of the screw. The anti-rotation feature of the screw may extend circumferentially around an entirety of the circumference of the screw. Alternatively, the anti-rotation feature may only be located on a portion of the walls that define an interior surface of the screw.

The anti-rotation feature of the screw may engage an anti-rotation feature of the spindle. The anti-rotation feature of the spindle may be a mating surface of the spindle that has a similar feature or a differing surface. For example, the spindle may have a mating surface that mates with the anti-rotation feature of the screw or the spindle may have a dissimilar surface so that the anti-rotation feature of the screw abuts the spindle in a non-planar manner. The anti-rotation feature or features of the spindle may extend along an entirety or a portion of a length of the spindle. The length and/or location of the anti-rotation feature along the spindle may be similar to a length and/or location of the anti-rotation feature of the screw. However, it need not be the case in all circumstances.

The spindle may include a flange having the anti-rotation feature to engage the screw. The flange may project from or axially extend beyond a general exterior surface of the spindle. The flange may extend outward so that the flange engages the screw while the remaining exterior surface of the spindle is free of contact with the screw (e.g., the interior surface of the screw). As a result, the flange may provide an anti-rotation feature to communication rotation of the spindle into rotation of the screw without requiring such an anti-rotation feature to extend along a substantial length of the spindle. In certain circumstances, the flange may be located near a terminal end (e.g., a “head” or “tail”) of the spindle while a remaining length of the spindle remains substantially circular along the exterior surface.

The spindle, the screw, the nut, or a combination thereof may be in communication with an end stop of the brake system. The end stop may function to provide a stopping point of travel for the nut. The end stop may act as an end or bumper for the BNA to prevent over-travel of the nut caused by rotation of the spindle. The end stop may prevent unwanted disengagement between any of the components within the BNA.

The end stop may be a disc, clip, bearing, or a combination thereof. The end stop may engage the spindle, screw, nut, or a combination thereof. The end stop may be free of contact with one or more of the spindle, the screw, the nut, or a combination thereof. The end stop may be adapted to rotate with the spindle, the screw, the nut, or a combination thereof. However, it is envisioned that the end stop may be rotated while remaining laterally in place. That is, the end stop may be prevented from axially moving along the longitudinal axis of the spindle, the screw, the nut, or a combination thereof.

The end stop may be press-fit or otherwise secured to the spindle, the screw, the nut, or a combination thereof. The end stop may engage an engaging portion of the screw, an engaging portion of the spindle, or both. The engaging portion may be a portion of the spindle and/or the screw along its length or may be a feature located therein intended to engage the end stop. For example, the spindle and/or the screw may have a threading portion extending along its length. The engaging portion that engages the end stop may be a portion of the spindle and/or the screw free of threading. As a result, the engaging portion may be inserted into a receiving portion—such as a cutout, opening, hole, etc.—of the end stop.

The end stop may also include a flange. The flange may project from one or more surfaces of the end stop. The flange may function to engage a flange of the nut to act as a stopping point for the nut during a brake apply, a brake release, a service release operation of the brake system, or a combination thereof. The flange of the end stop may abut a flange of the nut to prevent further axial travel of the nut away from the brake piston, thereby prevent rotation of the screw nut and/or the spindle. The flange of the end stop may extend from a surface in a direction parallel to an axis of rotation of the end stop. The flange may extend from a surface of the end stop in a direction perpendicular to an axis or rotation of the end stop.

The flange of the end stop and the flange of the nut may have abutting surfaces. The flange of the nut and the flange of the end stop may have similar shapes, mating features, planar contact surfaces, point contact surfaces, or a combination thereof. The flange design for both the end stop and the nut need not be limited to any specific shape and may be modified depending on a given application.

A portion of the BNA (e.g., the spindle, screw, nut, or a combination thereof) may contact the end stop within a mating area. The mating area may be defined as a general region in which a portion of the BNA contacts the end stop. The mating area may broadly be considered an entirety of a region circumferentially around a portion of the BNA and/or the end stop in which contact may exist between. The mating area may determine the engagement between a portion of the BNA and the end stop. That is, the end stop may be considered part of the BNA or may be a secondary component in communication with the BNA.

In conventional brake systems, operation of the BNA to drive the piston—and thus one or more brake pads—may result in deflection of the BNA relative to the end stop. That is, as the spindle rotates, the BNA may deflect from its axis of rotation, which may be shared with the axis of rotation of the end stop. Thus, the BNA and/or the end stop may tilt relative to each other. While such tilting to a certain point may be considered acceptable or necessary in certain brake systems, uncontrolled tilting (e.g., deflection) of the BNA and/or the end stop may cause increased degradation to the BNA and/or the end stop due to increased friction therein. Such friction may be increased by the tilting due to an increased pressure or load of the BNA against the end stop, thereby resulting in one or more surfaces of the BNA and/or one or more surfaces of the end stop to wear down at a faster pace. Thus, the overall life of the brake system—and in particular the BNA and/or the end stop—may be significantly decreased.

To combat such degradation, the present teachings contemplate improving the mating area between the BNA and the end stop. Such improvements may aid in preventing or decreasing the amount of tilt of the BNA relative to the end stop, or vice versa. Alternatively, or additionally, such improvements may include decreasing friction between the BNA and the end stop. To modify the amount of tilting, friction, or both, one or more contact regions within the mating area may be controlled.

The one or more contact regions within the mating area may function as the regions of direct and/or indirect contact between the BNA and the end stop. The contact regions may have direct contact between the BNA and the end stop, such that the spindle, the screw nut, the nut, or a combination thereof directly contact a surface of the end stop. Alternatively, or additionally, the contact regions may have indirect contact between the BNA and the end stop, such that one or more balls, biasing members (e.g., screws), bearing surfaces, or a combination thereof is located between the BNA and the end stop.

The contact regions may be a single contact region within the mating area or a plurality of contact regions within the mating area. One or more gaps may be positioned between or adjacent to the contact regions within the mating area. The gaps may be measured as a distance between a surface of the BNA and a surface of the end stop in which no contact—either direct or indirect—exists. The gaps may be about 0.1 mm or more, about 1 mm or more, or about 5 mm or more. The gaps may be about 10 mm or less, about 8 mm or less, or about 6 mm or less. The gaps may be a single gap or may be a plurality of gaps. The gaps may be uniform, may vary in shape, may be symmetrical, or a combination thereof. Conversely, the mating area may be free of any gaps.

The contact regions may be a point contact, a line contact, a surface or planar contact, or a combination thereof between the BNA and the end stop (or an intermediate member therebetween, such as a ball). However, it is envisioned that the contact regions as a whole (i.e., in combination) may have an area of contact between the BNA and the end stop that is greater than a single point contact or a single line contact. For example, a single line contact may trace a line circumferentially between the BNA and the end stop. Such a line may extend an entirety of a circumference of the end stop and/or the BNA. The single line contact may also be defined herein as a "line" or path of contact between the BNA and the end stop that is minimal, such as about 10 microns or less, about 5 microns or less, or about 3 microns or less. The width of the path of contact may be about 1 micron or more, about 2 microns or more, or about 3 microns or more. Such a width may be measured transversely to a direction of the path of the line contact. For example, the width may be measured at least partially laterally relative to an axis of rotation of the BNA and/or the end stop.

As stated above, the contact regions as described herein may advantageously provide for more than a single point contact or a single line contact. In doing so, the contact regions may better control tilt of the BNA during operation, may stabilize the BNA, may improve efficiency of load and/or pressure distribution between components, may decrease friction between the BNA and the end stop, or a combination thereof.

To improve over a single line contact between the BNA and the end stop, the contact regions may include a plurality of line contacts, one or more surface or planar contacts, or a combination thereof. As a result, an overall area of contact between the BNA and the end stop—whether direct or indirect—would be greater than a single line contact. To create the plurality of line contacts, one or more planar contacts, or both, an exterior surface of the spindle, an exterior surface of the screw nut, and exterior surface of the end stop, or a combination thereof located within the mating area may be modified to dictate engagement therebetween.

The surface of the end stop within the mating area may include one or more contoured portions, one or more planar portions, or both. The surface of the end stop within the mating area may include a uniform shape or may include one or more differing segments. For example, the surface of the end stop within the mating area may include an overall arcuate portion that is convex and/or concave in shape relative to the exterior surface of the BNA. The arcuate portion may have a constant radius along the entirety of the exterior surface of the end stop or may include a plurality of radii such that a radius of curvature of the end stop surface varies within the mating area. As a result, while the arcuate portion of the end stop may be continuous, the varying curvature may provide a means for a plurality of contact regions between the end stop and the BNA.

In a similar manner, the BNA (e.g., the spindle, the screw, or both) may have an exterior surface within the mating area adapted for engagement with the exterior surface of the end stop described above. The surface of the BNA include one or more contoured portions, one or more planar portions, or both. The surface of the BNA may have a similar contour to that of the surface of the end stop. However, the surface of the BNA may also be dissimilar to provide additional contact regions between the BNA and the end stop. For example, as described above, the end stop may have a curved surface with a plurality of radii. To mate with the curved surface, the BNA may have a curved surface to form a nesting relation with the end stop, whereby the end stop may be convex in shape while the BNA is concave in shape, or vice versa. Alternatively, the BNA may have one or more planar portions that engage the plurality of radii formed by the end stop, thereby increasing the amount of contact regions between the BNA and the end stop.

Contact regions may also be planar contact between the BNA and the end stop. That is, the BNA and the end stop may have one or more contact regions having an area significantly greater than a line contact. The planar contact may be defined as having a width as measured transverse to a path of the planar contact similar to the measurement of the width of the line contact described above—of about 0.05 mm or more, about 0.5 mm or more, or about 1 mm or more.

The width of the planar contact may have a width of about 5 mm or less, about 4 mm or less, or about 3 mm or less.

Similarly, an overall area of the planar contact would be significantly greater than an overall area of a line contact between the end stop and the BNA. The overall area of the planar contact would be about 50% greater or more than an overall area of a line contact, about 100% greater or more, or about 150% greater or more. The overall area of the planar contact would be about 300% greater or less, about 200% greater or less, or about 150% or less than an overall area of a line contact between the end stop and the BNA.

The surface of the BNA and/or the end stop within the mating area may be conically shaped. The surface of the BNA and/or the end stop may be tapered. The surface of the BNA and/or the end stop may be undulating, may include one or more notches, may include one or more grooves, may include one or more cutouts, or a combination thereof. The surface of the BNA and/or the end stop may converge toward one another, may diverge from one another, or both.

The surface of the BNA and/or the end stop may be treated to improve hardness, decrease friction, or both. The surfaces may be coated or plated. The surfaces may be hardened. The surfaces may be treated with one or more friction modifiers, such as a lubricant. The surfaces may be treated for micro-deformation, such as through machine milling and/or other mechanical surface treatment (e.g., peening, etc.) to further improve contact within the contact regions, to increase the number of contract regions within the mating area, or both.

Additionally, while there may exist a rolling region between the nut of the BNA and the end stop. The rolling region may function at an abutting surface in which the nut may reach during operation of the BNA to prevent over-travel of the nut in an axial direction beyond the end stop. The rolling region may provide a point of contact between the end stop and the nut, whereas the mating area described above may relate to contact between the spindle and/or the screw and the end stop.

The rolling region may have contact surfaces between the end stop and the nut. Such surfaces may also form their own contact regions similar or different from the mating area. The surfaces of the nut and/or the end stop within the rolling region may have any of the features identified above with respect to the mating area.

The rolling region may also facilitate an at least partial nesting relationship between the end stop and the nut. That is, the end stop may be at least partially nested within the confines of the nut along a length of the nut. As a result, an overall length of the BNA in combination with the end stop, as measured along the longitudinal axis or axis of rotation of the BNA, may be decreased to improve packaging within the brake system. The surface of the end stop may facilitate nesting within the nut to condense that amount of space or length needed outside of the nut to package the end stop. An entirety of the end stop may be nested within the nut or only a portion of the end stop may be positioned within the confines of the nut. About 5% or more, about 10% or more, or about 25% or more of the end stop may be positioned within the nut. About 50% or less, about 35% or less, or about 30% or less of the end stop may be positioned within the nut.

Turning now to the figures, FIG. 1 illustrates a cross-section of a brake system 20. The brake system 20 includes a brake caliper 22. The brake caliper 22 may be adapted to house one or more brake pads. For example, the brake caliper 22 may house an inboard brake pad 24 and an outboard brake pad 26. One or more of the brake pads 24, 26 may be actuated to provide a clamping force on a rotor (not shown) by a piston 30 positioned within a caliper bore 28 (e.g., a piston housing part of or located within the caliper bore 28) of the brake caliper 22. The piston 30 may move in a brake apply direction (AD) so that the brake pads 24, 26 engage the rotor. Additionally, the piston 30 may move in a release direction (RD) so that the brake pads 24, 26 may disengage the rotor.

A ball and nut assembly (BNA) 34 may move the piston 30 in the apply direction (AD) and/or the release direction (RD). The BNA 34 may include a spindle 36 positioned at least partially within a piston pocket 32 of the piston 30. The spindle 36 may include an input portion 40 adapted to communicate with a motor (not shown) so that the motor may rotate the spindle 36. As the spindle 36 is rotated about a longitudinal axis (LA) of the spindle 36, a threaded portion of the spindle 36 may engage a threaded portion of a nut 50. As the spindle 36 rotates and engages the nut 50, the nut 50 may move in the apply direction (AD) to contact the piston 30. As a result, the piston 30 may contact the inboard brake pad 24, thereby moving the inboard brake pad 24 into contact with the rotor (not shown).

Additionally, as illustrated in FIG. 1, the input portion 40 of the spindle 36 may extend out of the caliper bore 28 through an end stop 70 and a clip 82. The end stop 70 may be adapted to stop a direction of travel of the nut 50 in the release direction (RD). Similarly, the end stop 70 may communicate with a portion of the spindle 36 during rotation of the spindle 36.

Figure 2:
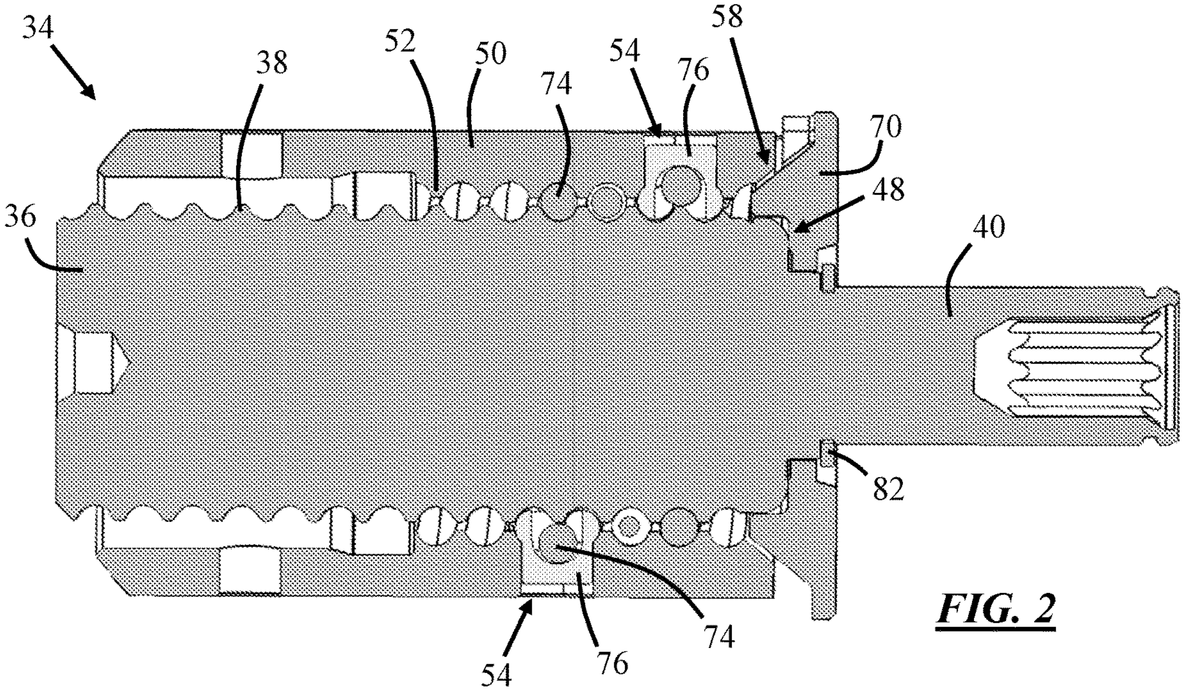
FIG. 2 is a cross-section of a ball and nut assembly in accordance with the present teachings.

FIG. 2 illustrates a cross-section of a ball and nut assembly 34 in accordance with the present teachings. The ball and nut assembly 34 may include a spindle 36 at least partially positioned within a nut 50. The spindle 36 may include a threaded portion 38 adapted to engage or mesh with a threaded portion 52 of the nut 50. That is, the spindle 36 may include an external threaded portion 38 that engages an internal threaded portion 52 of the nut 50. To facilitate such engagement, the ball and nut assembly (BNA) 34 may include a plurality of balls 74 positioned between the threaded portion 38 of the spindle 36 and the threaded portion 52 of the nut 50. The balls 74 may allow for linear travel of the nut 50 along the threaded portion 38 of the spindle 36 during a brake apply operation, a brake release operation, or both. During such operation, an input portion 40 of the spindle 36 may be rotated by a motor (not shown). As the spindle 36 rotates, the nut 50 may move linearly towards or away from a brake pad (see FIG. 1). During rotation, the balls 74 may also move along the spindle 36 between return caps 76 of the BNA 34 located within cutouts 54 of the nut 50. However, it should be noted that the nut 50 may also include one or more cutouts 54 free of a return cap 76 for the balls 74.

The input portion 40 of the spindle 36 may extend through an end stop 70 of the BNA 34 so that the end stop 70 may be secured in place via a clip 82 at least partially surrounding the input portion 40 of the spindle 36. The end stop 70 may communicate with the spindle 36 to maintain a position of the spindle 36 during operation. To do so, a mating area 48 may exist between the spindle 36 and the end stop 70, whereby the spindle 36 contacts a portion of the end stop 70. Additionally, the end stop 70 may provide a rolling region 58 for the nut 50 so that the end stop 70 may prevent over-travel of the nut 50 in a release direction.

Figure 3:
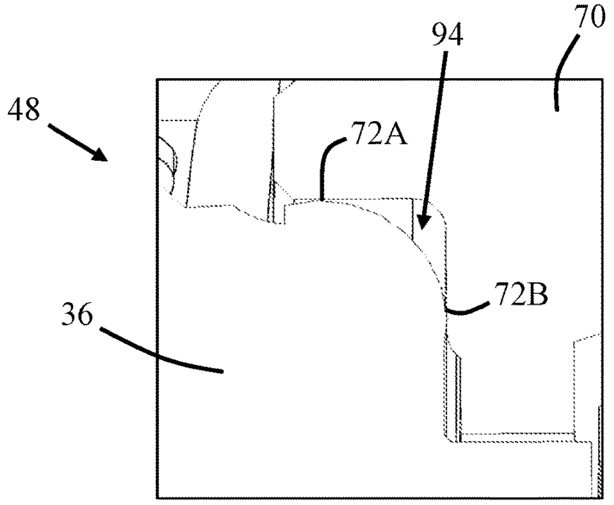
FIG. 3 is close-up view of the mating area of FIG. 2.

FIG. 3 illustrates a close-up view of the mating area 48 of the BNA shown in FIG. 2. As stated above, the mating area 48 may be an area between the spindle 36 and the end stop 70 where the spindle 36 contacts the end stop 70. While such contact may be needed to ensure proper positioning of the spindle 36 during operation, conventional end stops 70 may unfortunately be unable to prevent unwanted deterioration of the spindle 36 in the mating area 48 due to friction between the spindle 36 and the end stop 70 during rotation of the spindle 36. Similarly, a pressure and/or load distribution along the spindle 36 may occur due to deflection in the brake caliper (see FIG. 1), whereby a conventional end stop 70 may be unable to maintain the position of the spindle 36. As a result, the spindle 36 may tilt or deflect relative to its longitudinal axis, thereby resulting in further deterioration of the BNA or even causing the BNA to be inoperable.

Advantageously, the present teachings may provide an improved mating area 48, such as the one shown in FIG. 3. As shown in FIG. 3, the spindle 36 may engage the end stop 70 at a plurality of contact regions 72. The spindle 36 may include a substantially arcuate portion so that the spindle 36 contacts the end stop 70 in two distinct contact regions 72. A gap 94 or space may exist between the spindle 36 and the end stop 70 between the two contact regions 72. Beneficially, the contact regions 72 may be substantially tangential to one another to better aid in maintaining a position of the spindle 36 during rotation. That is, a first contact region 72A may be along a surface of the spindle 36 and/or the end stop 70 that is substantially perpendicular to the longitudinal axis of the spindle 36 while a second contact region 72B may be along a surface of the spindle 36 and/or the end stop 70 that is substantially parallel to the longitudinal axis of the spindle 36. As a result, the contact regions 72 may prevent unwanted tilting of the spindle 36 relative to the longitudinal axis of the spindle 36.

Figure 4:
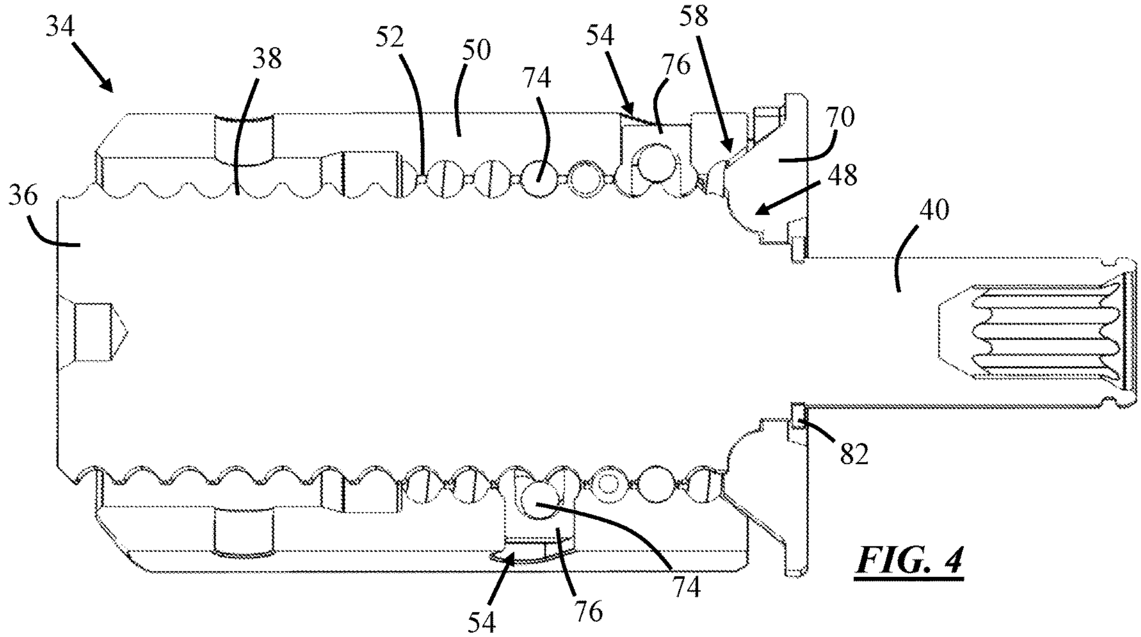
FIG. 4 is a cross-section of a ball and nut assembly in accordance with the present teachings.

FIG. 4 illustrates a cross-section of a ball and nut assembly 34 in accordance with the present teachings. The ball and nut assembly 34 may include a spindle 36 at least partially positioned within a nut 50. The spindle 36 may include a threaded portion 38 adapted to engage a threaded portion 52 of the nut 50. To facilitate such engagement, the BNA may include a plurality of balls 74 positioned between the threaded portion 38 of the spindle 36 and the threaded portion 52 of the nut 50. The balls 74 may also be contained between return caps 76 located in cutouts 52 of the nut 50.

An input portion 40 of the spindle 36 may extend through an end stop 70 of the BNA 34 so that the end stop 70 may be secured in place via a clip 82 at least partially surrounding the input portion 40 of the spindle 36. A mating area 48 may exist between the spindle 36 and the end stop 70, whereby the spindle 36 contacts a portion of the end stop 70. Additionally, the end stop 70 may provide a rolling region 58 for the nut 50 so that the end stop 70 may prevent over-travel of the nut 50 in a release direction.

Figure 5A:
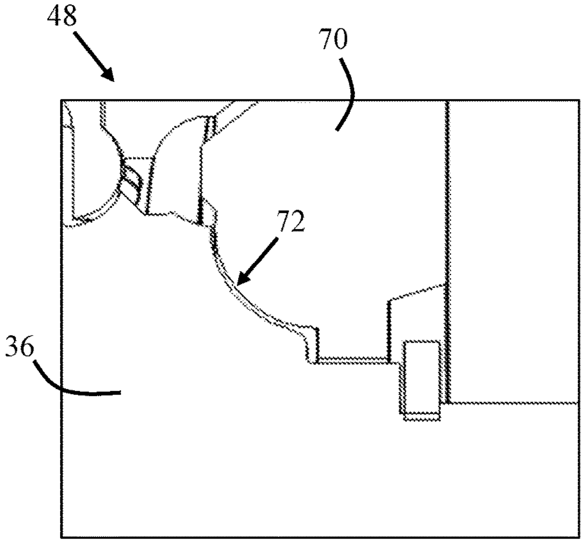
FIG. 5A is close-up view of the mating area of FIG. 4.

FIG. 5A illustrates a close-up view of the mating area 48 of the BNA shown in FIG. 4. As stated above, the mating area 48 may be an area between the spindle 36 and the end stop 70 where the spindle 36 contacts the end stop 70. The mating area 48 may include a contact region 72 in which the spindle 36 may directly contact the end stop 70. As shown, the contact region 72 may be a region in which an arcuate portion of the end stop 70 at least partially abuts an arcuate portion of the spindle 36. In this particular case, the arcuate portion of the end stop 70 may be a convex surface that extends outwardly towards—and is at least partially seeded within—a concave arcuate surface of the spindle 36. As such, contact between the spindle 36 and the end stop 70 may extend along all or a portion of the arcuate portions of the spindle 36 and the end stop 70. Advantageously, such a contact region may also facilitate a substantially continuous contact between the spindle 36 and the end stop 70 free of gaps. However, it should be noted that in certain circumstances a gap within the contact region 72 may exist between the spindle 36 and the end stop 70. Advantageously, based on the above, the contact region 72 may aid rotation of the spindle 36 during operation while better controlling unwanted tilt during operation of the BNA.

Figure 5B:
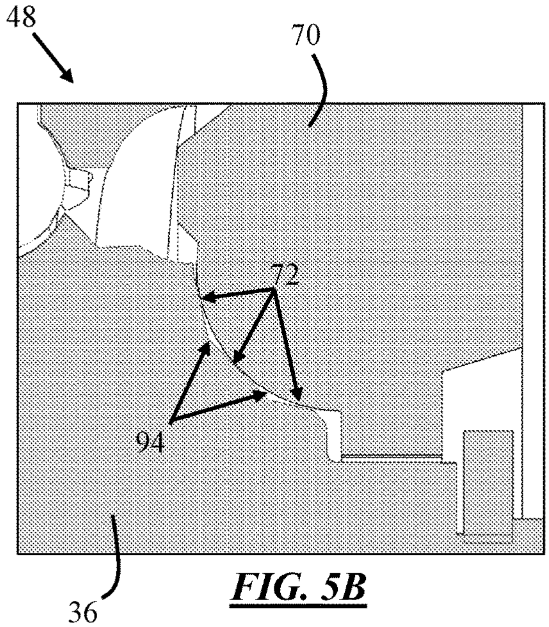
FIG. 5B is an alternative close-up view of the mating area of the ball and nut assembly of FIG. 4.

FIG. 5B illustrates a close-up view of an additional mating area 48 between a spindle 36 and an end stop 70. The mating area 48 may be located within a BNA such as the one shown in FIG. 4. However, the structure of the BNA may not be limited by the mating area 48 shown.

As illustrated, the mating area 48 between the spindle 36 and the end stop 70 may include a plurality of contact regions 72. Similar to FIG. 5A as stated above, the end stop 70 may include a convex surface that extends towards an over concave surface of the spindle 36. However, unlike the concave surface shown in FIG. 5A, the spindle 36 may include a plurality of dissimilar segments within the concave surface. That is, the concave surface may include a plurality of substantially planar connected portions that create the plurality of contact regions 72 (e.g., contact points) between the substantially continuous convex surface of the end stop 70 and the spindle 36. While the surface of the spindle 36 may include a plurality of flat or substantially planar surfaces connected to each other, it is also envisioned that the surface of the spindle 36 located within the mating area 48 may include a plurality of segments each having dissimilar curvatures. That is, a radius of curvature of each of the connected segments may vary to the plurality of contact regions 72. As a result, there may be one or more gaps present between the end stop 70 and the spindle 36 within the mating area 48.

Figure 6:
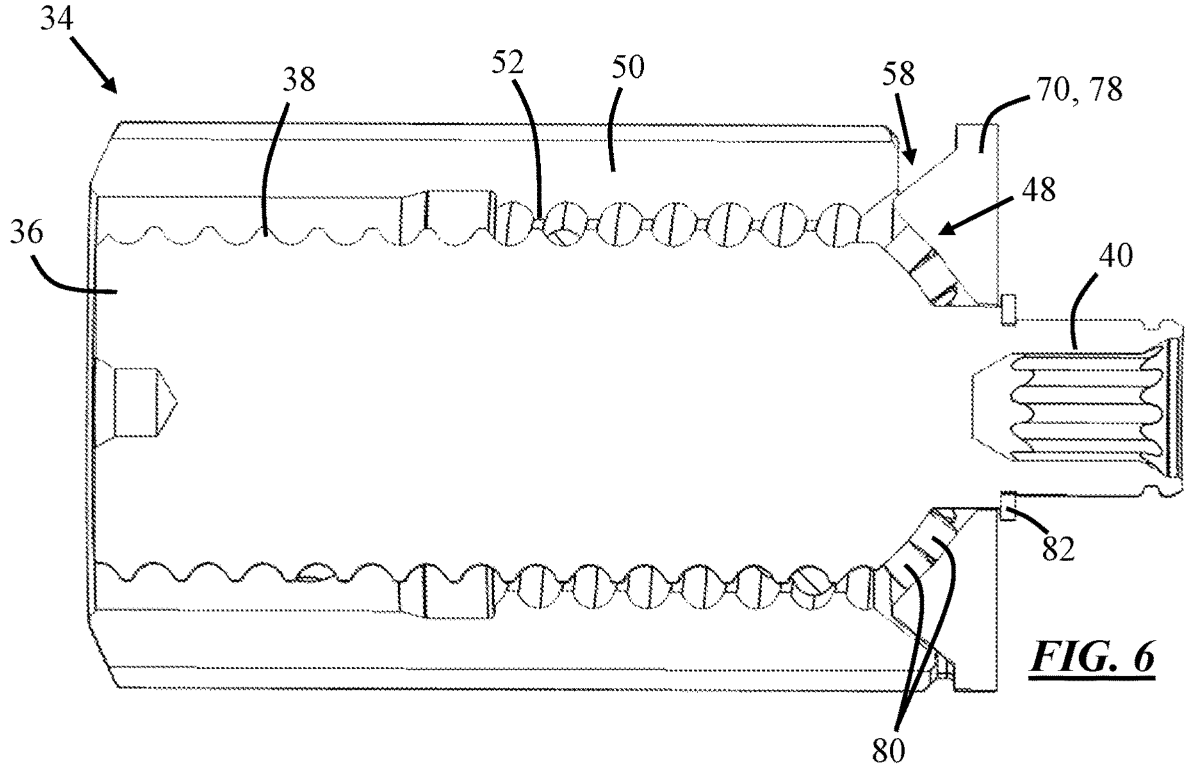
FIG. 6 is a cross-section of a ball and nut assembly in accordance with the present teachings.

FIG. 6 illustrates a cross-section of a ball and nut assembly (BNA) 34 in accordance with the present teachings. The ball and nut assembly 34 may include a spindle 36 at least partially positioned within a nut 50. The spindle 36 may include a threaded portion 38 adapted to engage a threaded portion 52 of the nut 50. While not shown, a plurality of balls, one or more biasing members, or both may be positioned between the spindle 36 and the nut 50 to aid with travel of the nut 50 along the spindle 36 during rotation of the spindle 36.

An input portion 40 of the spindle 36 may extend through an end stop 70 of the BNA 34 so that the end stop 70 may be secured in place by a clip 82 at least partially encompassing a portion of the spindle 36. In this particular case, the end stop 70 may be or include a bearing 78 that creates a mating area 48 between the spindle 36 and the end stop 70. While discussed in further detail below, the bearing 78 may include one or more rollers 80 that contact the spindle 36. Additionally, the end stop 70 may also include a rolling region 58 between the nut 50 and the end stop 70 that, in certain circumstances, may contact the nut 50 to prevent axial movement of the nut 50 (e.g., during a retraction of the nut 50).

Figure 7:
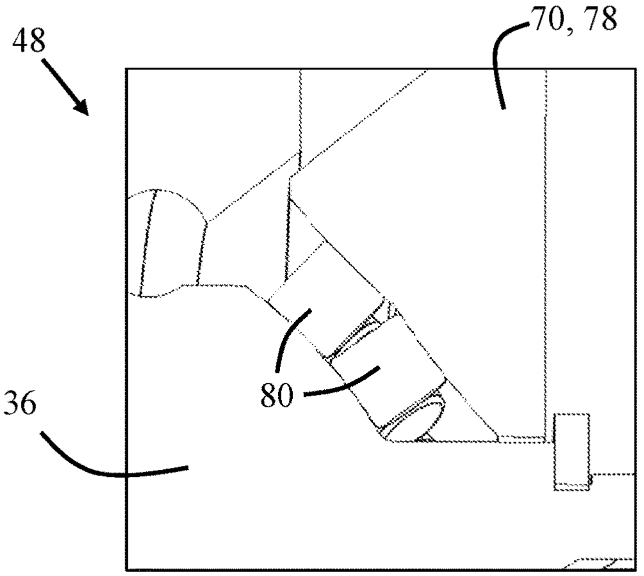
FIG. 7 is close-up view of the mating area of FIG. 6.

FIG. 7 illustrates a close-up view of the mating area 48 of the BNA shown in FIG. 6. As stated above, the mating area 48 may be an area between the spindle 36 and the end stop 70 where the spindle 36 may contact a portion of the end stop 70. In this particular case, the end stop may be or include a bearing 78 so that one or more rollers 80 may be positioned between the end stop 70 and the spindle 36. The rollers 80 may contact both the spindle 36 and the end stop 70 within a contact region 72 so substantially or entirely fill a gap that may exist between the spindle 36 and the end stop 70 otherwise. Advantageously, in utilizing a bearing 78, the end stop 70 may be positioned closer to the spindle 36 and/or the nut 50, thereby decreasing an overall length of an input portion of the spindle as measured along a longitudinal axis of the spindle 36.

Figure 8:
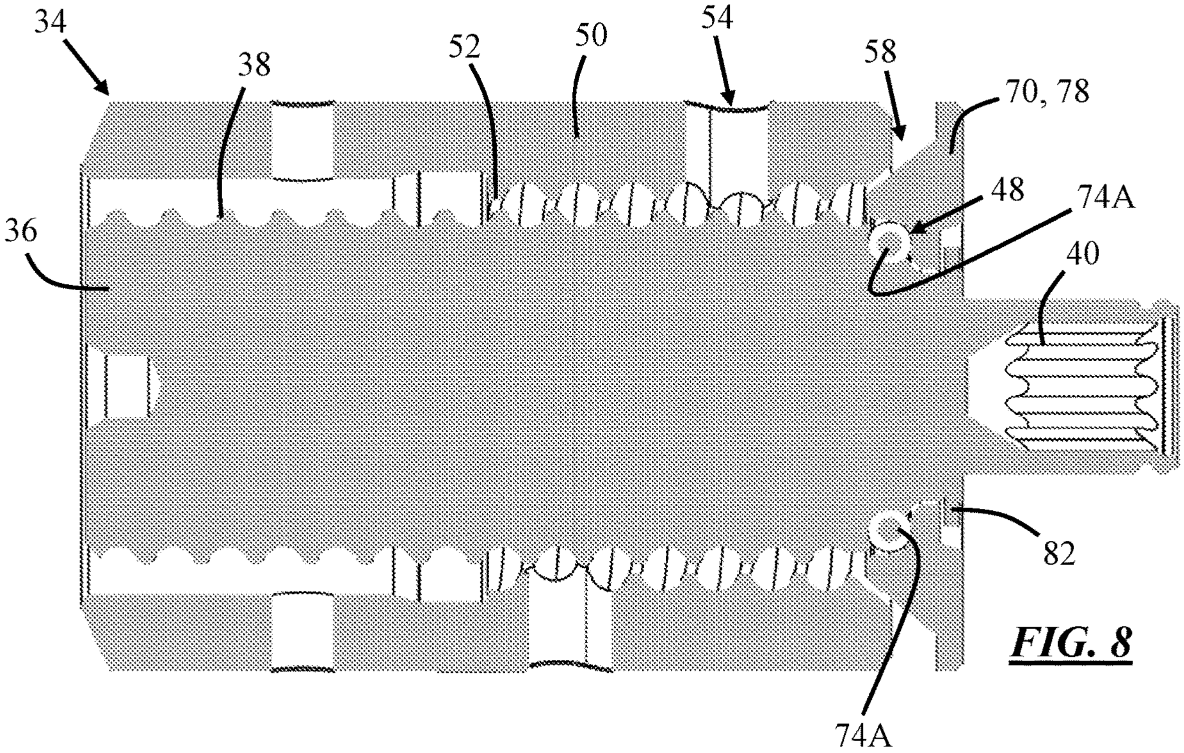
FIG. 8 is a cross-section of a ball and nut assembly in accordance with the present teachings.

FIG. 8 illustrates a cross-section of a ball and nut assembly 34 in accordance with the present teachings. The ball and nut assembly 34 may include a spindle 36 at least partially positioned within a nut 50. The spindle 36 may include a threaded portion 38 adapted to engage a threaded portion 52 of the nut 50. Additionally, as shown, the nut 50 may include one or more cutouts 54 extending through a wall thickness of the nut 50.

An input portion 40 of the spindle 36 may extend through an end stop 70 of the BNA 34 so that the end stop 70 may be secured in place relative to the spindle 36 by a clip 82. A mating area 48 may exist between the spindle 36 and the end stop 70, whereby the spindle 36 contacts a portion of the end stop 70. The end stop 70 may include or at least partially form a bearing 78 that creates the mating area 48 between the spindle 36 and the end stop 70. For example, a plurality of bearing balls 74A may be located between the spindle 36 and the end stop 70 to create contact between the spindle 36 and the end stop 70. Additionally, the end stop 70 may also include a rolling region 58 between the nut 50 and the end stop 70 that, in certain circumstances, may contact the nut 50 to prevent axial movement of the nut 50 (e.g., during a retraction of the nut 50).

Figure 9:
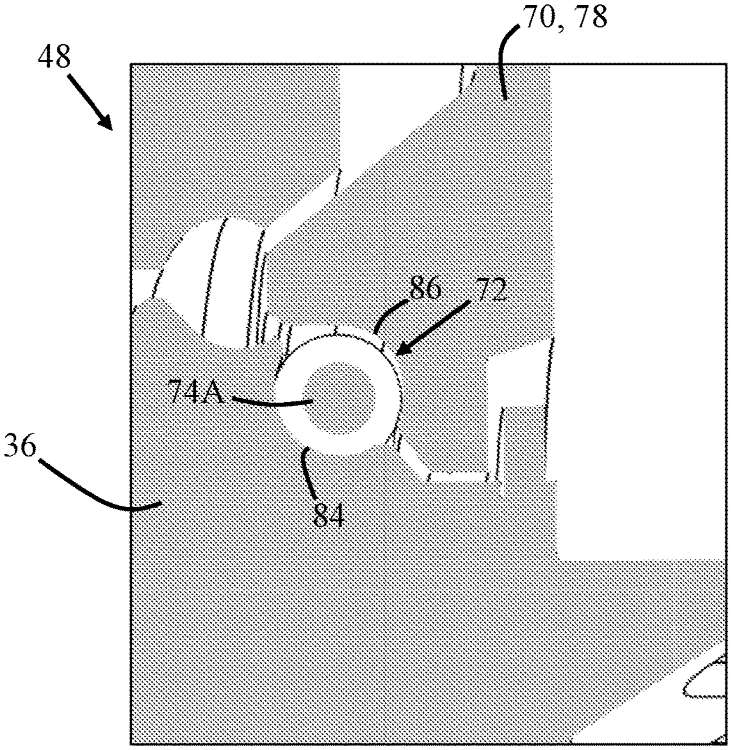
FIG. 9 is close-up view of the mating area of FIG. 8.

FIG. 9 illustrates a close-up view of the mating area 48 of the BNA shown in FIG. 8. The mating area 48 may be an area between the spindle 36 and the end stop 70 where the spindle 36 contacts a portion of the end stop 70. Contact between the spindle 36 and the end stop 70 may be direct or indirect. For example, as shown in FIG. 9, the end stop 70 may incorporate a bearing 78 having one or more ball bearings 74A so that the spindle 36 indirectly contacts the end stop 70 through the ball bearings 74A within a contact region 72. The ball bearings 74A may be located within a channel formed between a groove 84 of the spindle 36 and a groove 86 of the end stop 70. The groove 84 of the spindle 36 and the groove 86 of the end stop 70 may both be concave surfaces extending substantially away from one another to create the channel therein.

Figure 10:
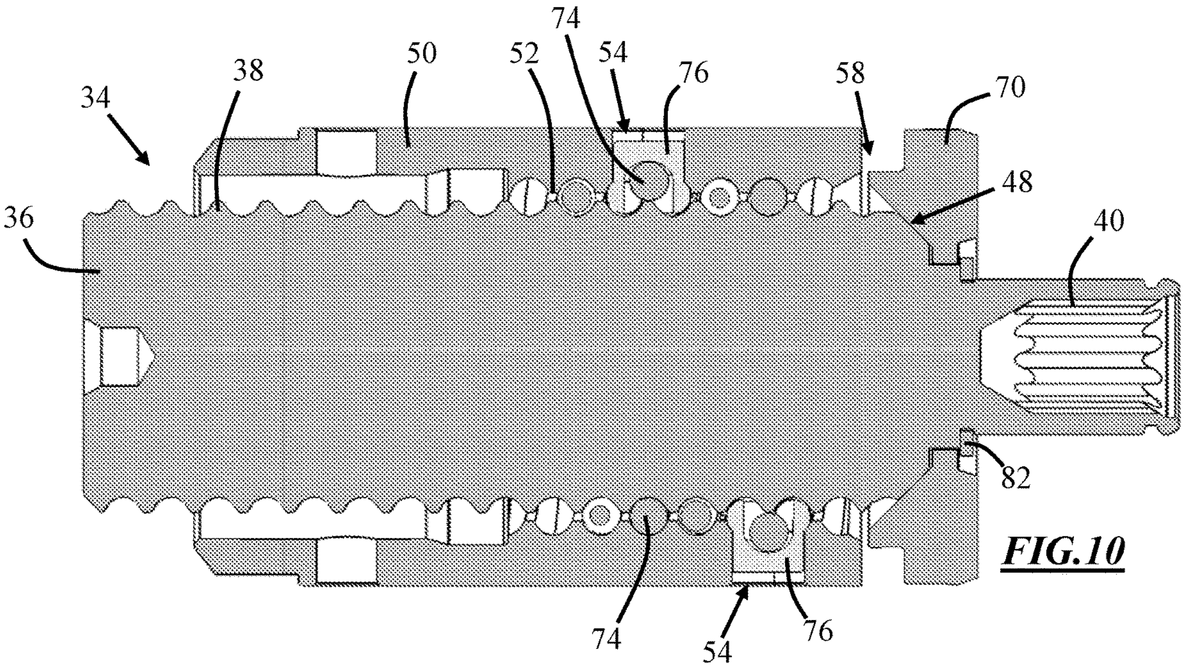
FIG. 10 is a cross-section of a ball and nut assembly in accordance with the present teachings.

FIG. 10 illustrates a cross-section of a ball and nut assembly 34 in accordance with the present teachings. The BNA 34 may include a spindle 36 at least partially positioned within a nut 50. The spindle 36 may include a threaded portion 38 adapted to engage a threaded portion 52 of the nut 50. One or more balls 74 may be located between the spindle 36 and the nut 50 to aid with operation of the BNA 34. The balls may be contained by one or more return caps 76 located within cutouts 54 of the nut 50.

An input portion 40 of the spindle 36 may extend through an end stop 70 of the BNA 34 so that the end stop 70 may be secured in place relative to the spindle 36 by a clip 82. A mating area 48 may exist between the spindle 36 and the end stop 70, whereby the spindle 36 contacts a portion of the end stop 70. Similarly, the end stop 70 may also include a rolling region 58 between the nut 50 and the end stop 70 that allows for contact between the nut 50 and the end stop 70 in certain situations.

Figure 11:
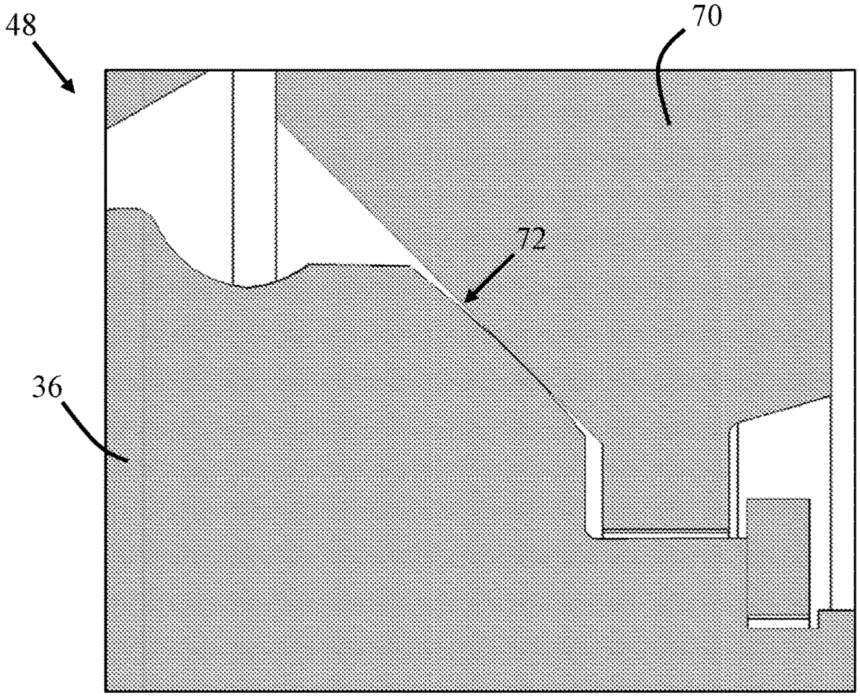
FIG. 11 is close-up view of the mating area of FIG. 10.

FIG. 11 illustrates a close-up view of the mating area 48 of the BNA shown in FIG. 10. The mating area 48 may be an area between the spindle 36 and the end stop 70 where the spindle 36 contacts a portion of the end stop 70. As shown, the spindle 36 may contact the end stop 70 in a contact region 72. Within the contact region 72, the spindle 36 may include an arcuate surface. The arcuate surface may have a continuous radius of curvature or may change its curvature along the surface. That is, the arcuate surface may have a plurality of radii of curvature.

Similarly, the surface along the spindle 36 may include a plurality of interconnected chamfers. Each chamfer may be substantially planar along the surface or may include a unique radius of curvature so that the surface of the spindle 36 as a whole may vary within the contact region 72. Advantageously, such a surface may interact with a substantially planar surface of the end stop 70 (e.g., a tapered surface) to increase the amount of contact surface between the spindle 36 and the end stop 70.

Figure 12:
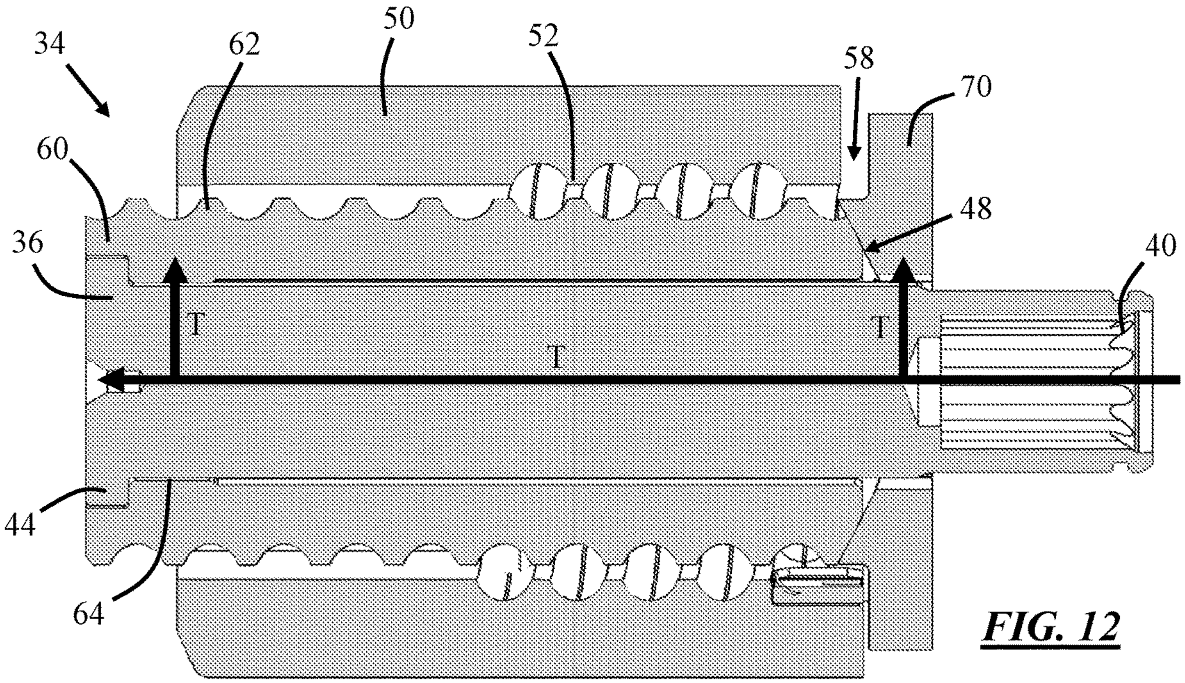
FIG. 12 is a cross-section of a ball and nut assembly in accordance with the present teachings.

FIG. 12 illustrates a cross-section of a ball and nut assembly 34 in accordance with the present teachings. The BNA 34 may include a spindle 36 at least partially positioned within a nut 50. The spindle 36 may include a head 44 that is seated within a portion of a screw 60. The screw 60 may include one or more anti-rotation features 64 that engage the spindle 36 and prevented unwanted rotation of the spindle 36 relative to the screw 60. That is, rotation of the spindle 36 may result in rotation of the screw 60.

The screw 60 may include a threaded portion 62 that engages a threaded portion 52 of the nut. As a result, the screw 60, upon rotation of the spindle 36, may engage the nut 50 and drive the nut 50 axially along the longitudinal axis of the spindle 36. As illustrated, a torque path (T) caused by driving (e.g., rotating) the spindle 36 on an input portion 40 of the spindle 36 may travel along the longitudinal axis of the spindle 36, thereby translating substantially orthogonally relative to the longitudinal axis into the screw 60 and an end stop 70 of the BNA 34.

The input portion 40 of the spindle 36 may extend through the end stop 70 until the end stop 70 abuts the screw nut 50 in a mating area 48. Additionally, the end stop 70 may also provide a rolling region 58 where the nut 50 may contact the end stop 50 during operation (e.g., retraction). However, it should also be noted that the nut 50 may be free of contact with the end stop 70 during operation.

Figure 13:
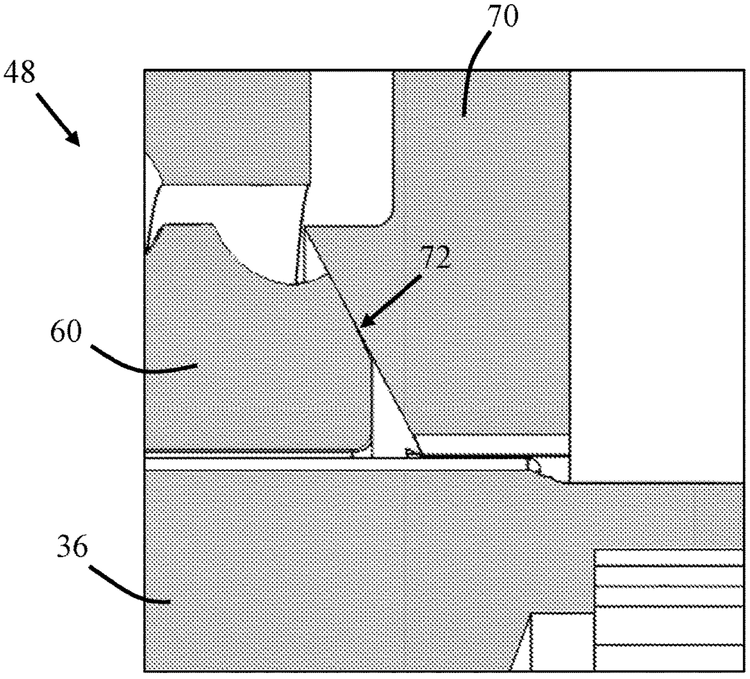
FIG. 13 is close-up view of the mating area of FIG. 12.

FIG. 13 illustrates a close-up view of the mating area 48 of the BNA shown in FIG. 12. The mating area 48 may be an area in which the screw 60 secured to the spindle 36 may directly contact the end stop 70. As shown, the end stop 70 may include a tapered surface that contacts the screw 60 in a contact region 72 therebetween. The tapered surface of the end stop 70 may be substantially planar, concave, convex, or a combination thereof. Similarly, the surface of the screw 60 located within the contact region 72 may be substantially planar, concave, convex, or a combination thereof. Advantageously, based upon the structure of the BNA, the spindle 36 may be substantially free of contact with the end stop 70, thereby decreasing wear of the spindle 36 during operation.

Figure 14:
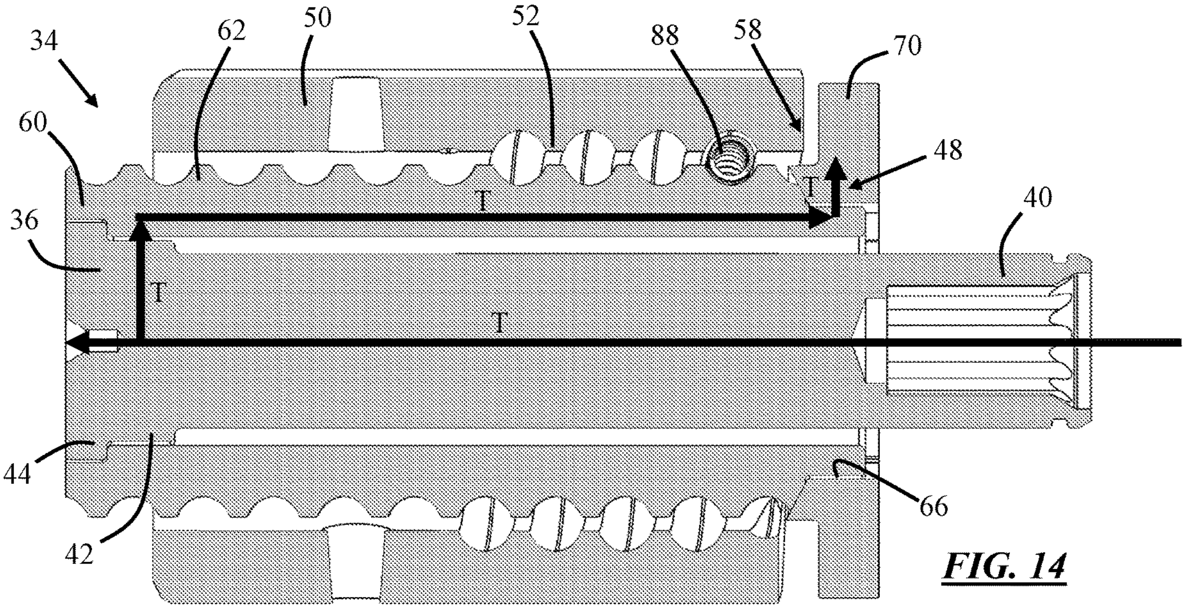
FIG. 14 is a cross-section of a ball and nut assembly in accordance with the present teachings.

FIG. 14 illustrates a cross-section of a ball and nut assembly 34 in accordance with the present teachings. The BNA 34 may include a spindle 36 at least partially positioned within a nut 50. The spindle 36 may include a head 44 that is seated within a portion of a screw 60. The spindle 36 may further include a flange 42 that extends outward to engage the screw 60 and prevent unwanted rotation of the spindle 36 relative to the screw 60. For example, the flange 42 may include one or more anti-rotation features that engage an anti-rotation feature of the screw 60 (see FIG. 17).

The screw 60 may include a threaded portion 62 that engages a threaded portion 52 of the nut. As a result, the screw 60, upon rotation of the spindle 36, may engage the nut 50 and drive the nut 50 axially along the longitudinal axis of the spindle 36. One or more biasing members 88 may be located between the screw 60 and the nut 50 to aid with operation of the BNA 34. As illustrated, a torque path (T)

caused by driving (e.g., rotating) the spindle 36 on an input portion 40 of the spindle 36 may travel along the longitudinal axis of the spindle 36, thereby translating substantially orthogonally relative to the longitudinal axis into the screw 60 and through the screw nut 60 into an end stop 70 of the BNA 34.

The input portion 40 of the spindle 36 may extend through the end stop 70 until the end stop 70 abuts the screw 60 in a mating area 48. Similarly, the screw 60 may include an engaging portion 66 that is received by the end stop 70. Additionally, the end stop 70 may also provide a rolling region 58 where the nut 50 may contact the end stop 70 during operation (e.g., retraction). However, it should also be noted that the nut 50 may be free of contact with the end stop 70 during operation.

Figure 15:
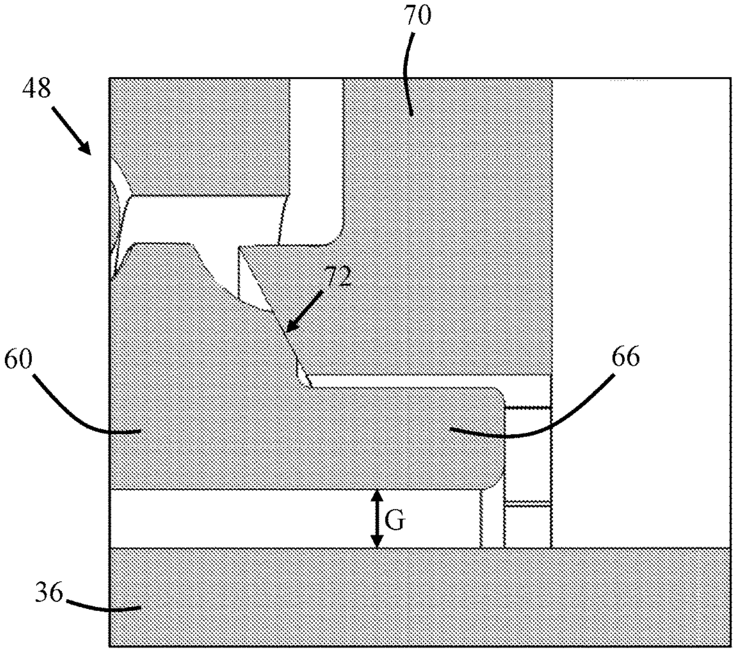
FIG. 15 is close-up view of the mating area of FIG. 14.

FIG. 15 illustrates a close-up view of the mating area 48 of the BNA shown in FIG. 14. The mating area 48 may be an area in which the screw 60 secured to the spindle 36 is in contact with the end stop 70. As shown, the end stop 70 may include a tapered surface that contacts the screw 60 in a contact region 72. A surface of the screw 60 within the contact region 72 may be substantially coplanar or parallel with the tapered surface of the end stop 7. For example, a surface of the screw 60 within the contact region 72 may be substantially planar to contact a substantially planar surface of the end stop 70. However, the screw 60 may also include one or more arcuate sections that engage the surface of the end stop 70.

Beneficially, the spindle 36 may be free of contact with the end stop 70 or at least free of contact with the end stop 70 within the mating area 48. As a result, the spindle 36 freely operate with possible deterioration of the spindle 36 and/or the end stop 70 due to contact therebetween. For example, the spindle 36 may extend through an opening of the end stop 70 so that a gap (G) exists between the spindle 36 and an engaging portion 66 of the screw 60 located between the spindle 36 and the end stop 70.

Figure 16:
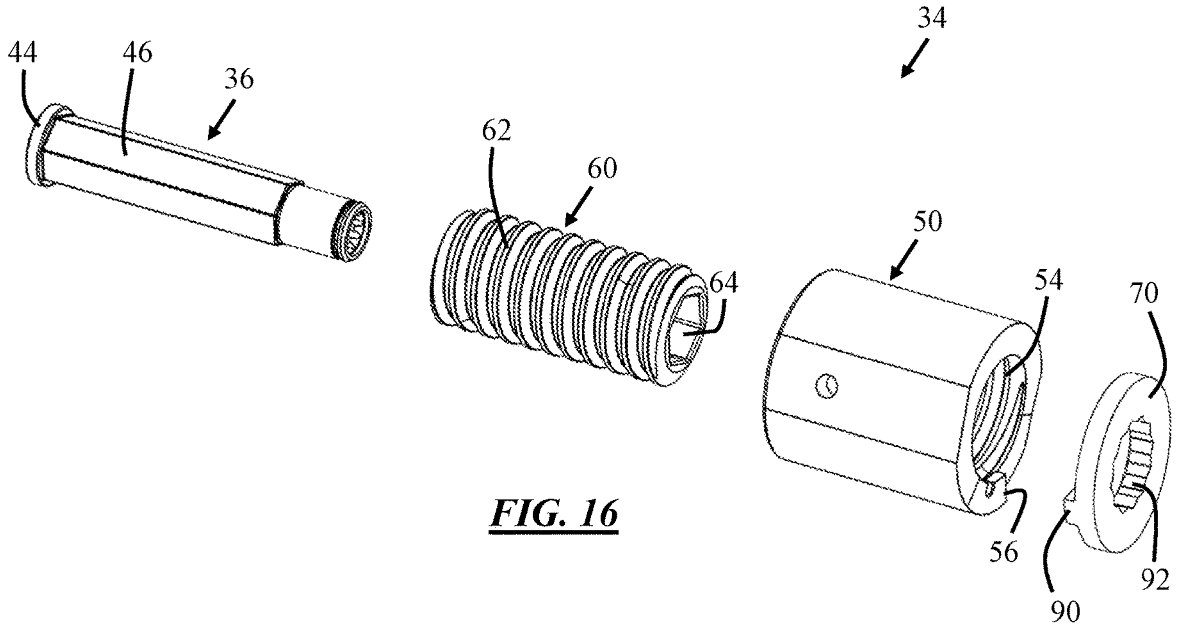
FIG. 16 is an exploded view of the ball and nut assembly of FIG. 12.

FIG. 16 illustrates an exploded view of the ball and nut assembly (BNA) 34 of FIG. 12. The BNA 34 may include a spindle 36. The spindle 36 may include a head 44 located near a distal end of the spindle 36. The head 44 may be adapted to engage a screw 60 of the BNA 34 to seat the head 44 at least partially within the screw 60. Similarly, the spindle 36 may also include an anti-rotation feature 46 that extends along an exterior surface of the spindle 36. The anti-rotation feature 46 may extend along an entirety of the length of the spindle 36 or only a portion of the length of the spindle (e.g., only along a portion of the spindle 36 that is located within the screw 60). As shown, the anti-rotation feature 46 is a plurality of abutting planar surface adapted to align with planar surfaces creating an anti-rotation features 64 within the screw 60. Advantageously, once the spindle 36 is inserted into the screw 60, the anti-rotation features 46 of the spindle 36 may communicate with the anti-rotation features 64 of the screw 60 to prevent rotation of the screw 60 relative to the spindle 36, or vice versa. The spindle 36 and screw 60 may be located within the confines of a nut 50 adapted to contact a piston and move a piston towards a brake pad (see FIG. 1). A threaded portion 54 of the nut 50 may engage a threaded portion 62 of the screw 60 so that, as the screw 60 rotates, the nut 50 may be moved axially along the longitudinal axis of the spindle 36.

Additionally, the spindle 36 may be adapted to extend through the nut 50 and a receiving portion 92 of an end stop 70 to communicate with a motor of the BNA 34 (not shown). The end stop 70 may also abut the nut 50 in certain circumstances so that a flange 56 of the nut 50 may abut a flange 90 of the end stop 70. For example, during retraction of the nut 50 (i.e., away from the piston of the brake system), the nut 50 may travel axially along the screw 60 towards the end stop 70 until the flange 56 of the nut 50 contacts the flange 90 of the end stop 70, thereby preventing over-travel of the nut 50 beyond the end stop 70.

Figure 17:
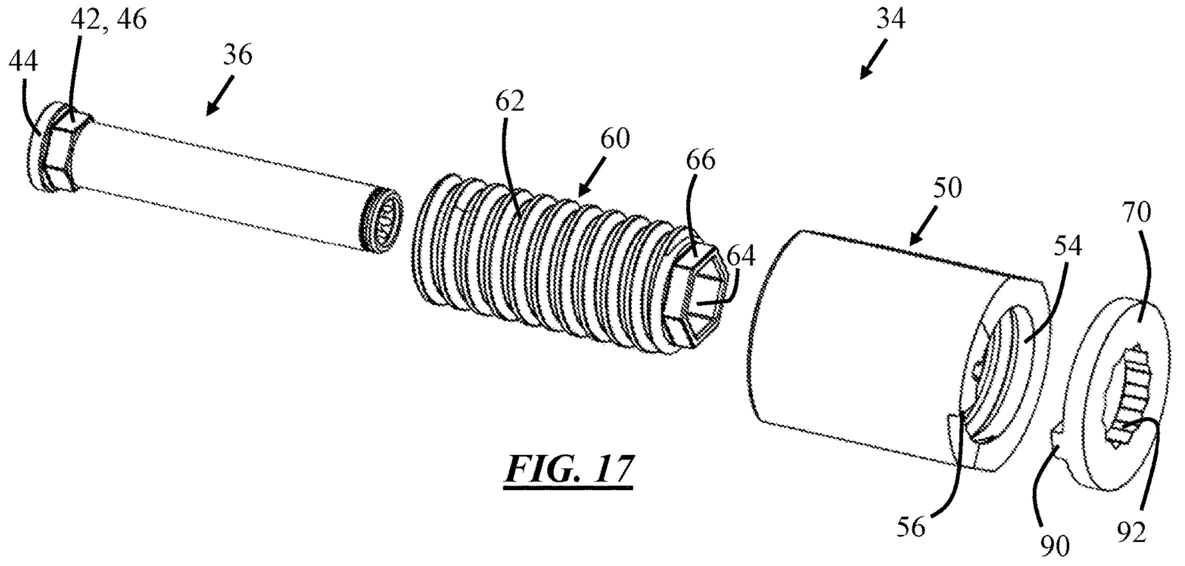
FIG. 17 is an exploded view of the ball and nut assembly of FIG. 14.

FIG. 17 illustrates an exploded view of the ball and nut assembly (BNA) 34 of FIG. 14. The BNA 34 may include a spindle 36. The spindle 36 may include a head 44 located near a distal end of the spindle 36. The head 44 may be adapted to engage a screw 60 of the BNA 34 to seat the head 44 at least partially within the screw 60. For example, the screw 60 may include a receiving portion, notch, groove, other feature, or a combination thereof that locates the head 44 of the spindle 36 along and/or within the screw 60. The spindle 36 may include a flange 42 located adjacent to the head 44 that engages the screw 60. The flange 42 may include an anti-rotation feature, such as one or more flat portions, that engage an anti-rotation feature 64 located within the screw 60. As a result, the flange 42 may prevent unwanted rotation between the spindle 36 and the screw 60, or vice versa.

The spindle 36 and screw 60 may be located within the confines of a nut 50 adapted to contact a piston and move a piston towards a brake pad (see FIG. 1). A threaded portion 54 of the nut 50 may engage a threaded portion 62 of the screw 60 so that, as the screw 60 rotates, the nut 50 may be moved axially along the longitudinal axis of the spindle 36. The end stop 70 may also abut the nut 50 in certain circumstances so that a flange 56 of the nut 50 may abut a flange 90 of the end stop 70. For example, during retraction of the nut 50 (i.e., away from the piston of the brake system), the nut 50 may travel axially along the screw 60 towards the end stop 70 until the flange 56 of the nut 50 contacts the flange 90 of the end stop 70, thereby preventing over-travel of the nut 50 beyond the end stop 70

Additionally, the spindle 36 and the screw 60 may be adapted to partially extend through the nut 50 so that an engaging portion 64 of the screw 60 extends into a receiving portion 92 of an end stop 70. Similarly, the spindle 36 may extend through the receiving portion 92 of the end stop 70 to communicate with a motor of the BNA 34 (not shown).

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference in their entireties for all purposes. Other combinations are also possible as will be gleaned from the following claims, which are also hereby incorporated by reference in their entirety into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

20 Brake System
22 Brake Caliper
24 Inboard Brake Pad
26 Outboard Brake Pad
28 Caliper Bore
30 Piston
32 Piston Pocket
34 Ball and Nut Assembly (BNA)
36 Spindle
38 Threaded Portion of the Spindle
40 Input Portion of the Spindle
42 Flange of the Spindle
44 Head of the Spindle
46 Anti-Rotation Feature of the Spindle
48 Mating Area (between the BNA and the End Stop)
50 Nut
52 Threaded Portion of the Nut
54 Cutout of the Nut
56 Flange of the Nut
58 Rolling Region (between the Nut and the End Stop)
60 Screw
62 Threaded Portion of the Screw Nut
64 Anti-Rotation Feature of the Screw Nut
66 Engaging Portion of the Screw Nut
70 End Stop
72 Contact Region (between the BNA and the End Stop)
74 Ball
74A Ball of the Bearing
76 Return Cap
78 Bearing
80 Roller
82 Clip
84 Groove of the Spindle
86 Groove of the Bearing
88 Biasing Member
90 Flange of the End Stop
92 Receiving Portion of the End Stop
94 Gap (between the Spindle and the End Stop)
AD Apply Direction
RD Release Direction
LA Longitudinal Axis of the Spindle
T Torque Path
G Gap between the Spindle and the Screw Nut

What is claimed is:

1. A ball and nut assembly adapted for a brake system of a vehicle, comprising:
(a) a nut having a threaded portion;
(b) a spindle having a threaded portion positioned at least partially within the nut so that the threaded portion of the spindle engages the threaded portion of the nut; and
(c) an end stop positioned adjacent to the spindle, wherein a mating area is located between the end stop and the spindle, the mating area includes a contact region in which the end stop contacts the spindle directly or indirectly, and the contact region includes a circumferential area greater than a circumferential area of a single line contact between the end stop and the spindle;
wherein the end stop prevents tilting of the spindle relative to a longitudinal axis of the spindle;
wherein a surface of the end stop within the mating area includes one or more arcuate portions, the surface of the end stop within the mating area is a convex surface, a surface of the spindle within the mating area is a concave surface, and the surface of the spindle within the mating area is arcuate.

2. The ball and nut assembly of claim 1, wherein the contact region includes one or more surface contacts between the end stop and the spindle, whereby each surface contact has a circumferential area greater than a single line contact.

3. The ball and nut assembly of claim 1, wherein the contact region includes a plurality of direct line contacts between the end stop and the spindle.

4. The ball and nut assembly of claim 3, wherein the plurality of direct line contacts between the end stop and the spindle have a width of about 10 microns or less, and the contact region has a width of about 50 microns or more.

5. The ball and nut assembly of claim 1, wherein a portion of the end stop partially abuts a portion of the spindle, and a gap exists between the spindle and the end stop.

6. The ball and nut assembly of claim 3, wherein the surface of the spindle within the mating area includes a plurality of interconnected linear segments, whereby each of the interconnected linear segments creates the contact region where the spindle contacts the end stop; and
wherein the spindle is free of contact with the end stop between the contact region created by the linear segments to form a plurality of gaps therein.

7. The ball and nut assembly of claim 1, wherein the surface of the spindle, the surface of the end stop, or both include a surface deformation formed from machining and/or mechanical surface treatment that decreases friction between the spindle and the end stop; and wherein the surface of the spindle, the surface of the end stop, or both are hardened or coated.

8. A ball and nut assembly for a brake system of a vehicle, comprising:

(a) a nut having a threaded portion;

(b) a screw located at least partially within the nut, wherein a threaded portion of the screw engages a threaded portion of the nut;

(c) a spindle extending through the screw so that rotation of the spindle causes rotation of the screw; and (d) an end stop in communication with the spindle, the screw, or both, wherein a mating area is located between the end stop and the screw, the mating area includes a contact region in which the end stop contacts the screw directly or indirectly, and the contact region includes a circumferential area greater than a circumferential area of a single line contact between the end stop and the screw;

wherein the end stop prevents tilting of the spindle relative to a longitudinal axis of the spindle;

wherein a surface of the end stop within the mating area includes one or more arcuate portions, the surface of the end stop within the mating area is a convex surface, a surface of the screw within the mating area is a concave surface, and the surface of the screw within the mating area is arcuate.

9. The ball and nut assembly of claim 8, wherein the screw contacts the end stop along a plurality of contact regions within the mating area.

10. The ball and nut assembly of claim 9, wherein the surface of the screw within the mating area includes one or more arcuate segments.

11. The ball and nut assembly of claim 10, wherein an engaging portion of the screw extends into a receiving portion of the end stop.

12. The ball and nut assembly of claim 11, wherein the spindle extends through the receiving portion and is free of contact with the end stop.

13. The ball and nut assembly of claim 12, wherein the spindle, the screw, or both include an anti-rotation feature that prevents rotation of the spindle relative to the screw, or vice versa.

* * * * *